(12) United States Patent
Patra et al.

(10) Patent No.: US 6,315,807 B1
(45) Date of Patent: Nov. 13, 2001

(54) FORMULATION USEFUL AS A NITRIFICATION AND UREASE INHIBITOR AND A METHOD OF PRODUCING THE SAME

(75) Inventors: Dharani Dhar Patra; Usha Kiran; Mohammed Anwar; Sukhmal Chand; Sushil Kumar, all of Locknow (IN)

(73) Assignee: Council of Scientific and Industrial Research, Lucknow (IN)

( * ) Notice: Subject to any disclaimer, the term of this patent is extended or adjusted under 35 U.S.C. 154(b) by 0 days.

(21) Appl. No.: 09/536,752

(22) Filed: Mar. 28, 2000

(51) Int. Cl.⁷ ....................................................... C05G 3/00
(52) U.S. Cl. ................................................. 71/28; 71/64.07
(58) Field of Search ........................................ 71/28, 64.07

(56) References Cited

FOREIGN PATENT DOCUMENTS

| | | | |
|---|---|---|---|
| 5677212 | * | 6/1981 | (JP) . |
| 62270485 | * | 11/1987 | (JP) . |
| 08019595 | * | 1/1996 | (JP) . |

OTHER PUBLICATIONS

Gould et al., "Urea Transformation and Fertilizer Efficiency in Soil", Adv. Agron., vol. 40, pp. 209–238 (1986).
K.L. Sahrawat, "Effects of Nitrification Inhibitors on Nitrogen Transformations, Other Than Nitrification, in Soils", Adv. Agron., vol. 42, pp. 279–309, (1989).
Prasad et al., Nitrification Inhibitors for Agriculture, Health, and the Enviroment, Adv. Agron., vol. 54, pp. 233–281 (1995).
Prasad et al., "Nitrification Retarders and Slow–Release Nitrogen Fertilizer", Adv. Agron., vol. 23, pp. 337–381 (1971).

* cited by examiner

Primary Examiner—Chhaya D. Sayala
(74) Attorney, Agent, or Firm—Greenblum & Bernstein P.L.C.

(57) ABSTRACT

The invention relates to a novel formulation useful as a nitrification and urease inhibitor, said formulation comprising an effective amount of nitrogenous fertilizer, castor oil and oil derived from *Artemisia annua*, in an amount sufficient to enhance the nitrification activity of the formulation, a method for producing the formulation and method for applying the same to soil.

14 Claims, No Drawings

FORMULATION USEFUL AS A NITRIFICATION AND UREASE INHIBITOR AND A METHOD OF PRODUCING THE SAME

FIELD OF INVENTION

The present invention relates to a novel formulation comprising nitrogenous fertilizers in combination with castor oil and oil derived from *Artemisia annua* useful as nitrification and urease inhibitor. More particularly, the invention relates to the development of a cheap, and potential urease/nitrification inhibitor from essential oil (*Artemisia annua* oil). The invention also provides a method for producing the novel formulation useful as nitrification inhibitor.

BACKGROUND OF THE INVENTION

Among the agricultural inputs to augment food production, use of fertilizer, in particular urea plays a key role. It is estimated that the present global consumption of fertilizer N is in the order of 77 Tg annually which is estimated to be increased to 144 Tg by the beginning of next century. In India, the present consumption of fertilizer N is about 9.5 m tons which is estimated to be increased to 14 m tons by 2001. Utilization efficiency of fertilizer N seldom exceeds 50%; it is yet low in paddy.

When applied to soil, urea hydrolyses by enzyme urease to from $NH_4$ and finally to $NO_3$ by some bacteria. The $NH_4$ is subjected to loss by volatilization whereas $NO_3$ is prone to losses through leaching and dentrification. Apart from increasing the cost of cultivation in agriculture, N losses through leaching as well as in gaseous form have direct concern in environmental degradation. As a consequence of leaching $NO_3$ concentration in ground water has been increasing at an alarming rate. Any strategy that can restrict or retard these processes, would reduce the loss of N. The present invention deals with finding strategies for retarding urea transformation and nitrification for a higher fertilizer N use efficiency.

Researchers have tried to reduce the losses of N (i) by applying N in small doses at different growth stages of crop, so that the plants use it before it is lost and (ii) by deep placement or incorporating the urea in soil. The ammonium produced can be retained for sometimes in the exchange complex of soil clay particles.

Some of the modern tools suggested are (I) use of urease inhibitors such as phenylphosphorodieamidate (PPD), hydroxamates and benzoqauinones (Gould, W D et al 1986, Adv. Agron. 40: 209–238), which reduce the hydrolysis of urea and this can reduce ammonia volatilization lossess, and (ii) use of nitrification inhibitors such as N serve or nitrapyrin (2-chloro-6(tricholoromethyl)-pyridine), DCD (dicyandiamide), AM (2-amino 4-chloro-6-methylpyrimidine), $KN_3$(potassium azide) and thiourea (Sahrawat, 1989, Adv.Agron 42: 279–302, Prasad and Power, 1995, Adv. Agron 54: 233–81).

These compounds have been successful in some parts of the world. However, because of cost and poor availability these could not be made commercially popular to common farmer. An interesting discovery was the nitrification inhibitory properties of neem seed cake (Prasad et al, 1971, Adv. Agron 23: 337–381) and neem cake coated urea and has found some favour among Indian farmers. Neem bittern/extracts such as Nimin, Neemex etc. for treating urea are in Indian market. More recently a neem oil urea emulsion adduct has also been reported (Prasad et al. 1998. Curr. Sci. 75: 15). Many of the fertilizer mixture, coated materials specially synthetic chemicals are put to limited use such as in turf or in high price agriculture such as commercial floriculture and that to in developed countries and have not reached the general farmers due to high costs.

OBJECTS OF THE INVENTION

The main object of the invention is to develop a novel urease and nitrification inhibitor from natural source, more particularly the evaluation of urease and nitrification inhibiting properties in Artemisia oil.

Another object is to develop novel urease nitrification inhibitor formulation comprising urea and other nitrogenous fertilizers, castor oil and oil derived from *Artemisia annua*.

Yet another object is to develop cheap and eco-friendly urease and nitrification inhibitor which is easily decomposable and leave no adverse influence in the soil.

Still another object is to provide a method for producing nitrification inhibitor formulation.

SUMMARY OF THE INVENTION

The present invention comprises of development of urease and nitrification inhibitors from essential oil and its derivatives coated with urea/ammonium producing N fertilizers (0.5–1.0% on w/w basis of fertilizer). Nitrogenous fertilizer is initially coated with castor oil at 1% (w/w basis of fertilizer). The coating resulted in retarding of nitrification by 29–36% as against 31–42% with dicyandiamide (DCD), which is taken as the reference. This formulation was found superior to DCD with respect to inhibition of urease activity (retarded by 32–35% as compared to DCD; 5–15%). The activity of both the nitrifying organisms i.e. Nirosomonus and Nitrobacter significantly decreased with this formulation. This natural product formulation augmented apparent N recovery to 56% against 37% with uncoated urea and 54% with DCD.

DETAILED DESCRIPTION OF THE INVENTION

Accordingly, the present invention provides a novel formulation useful as a nitrification and urease inhibitor, said formulation comprising an effective amount of nitrogenous fertilizer, castor oil and oil derived from *Artemisia annua*, in an amount sufficient to enhance the nitrification inhibitory activity of the formulation.

In an embodiment of the invention, the amount of caster oil can be selected from 0.2 to 2% (w/w basis of fertilizer), preferably 1.0% (w/w basis of fertilizer).

In another embodiment, the amount of oil used in the composition, which is derived from *Artemisia annua* may be in the range of about 0.5–5% (w/w basis of fertilizer).

In a further embodiment of the invention, the essential oil of *Artemisia annua* may be coated, mixed or doped with the nitrogenous fertilizer.

In another embodiment of the present invention, the nitrogen fertilizer may be selected from urea or ammonium sulphate and other ammonium producing fertilizer.

In yet another embodiment of the present invention, the essential oil may be selected from Artemisia oil or its derivatives.

In another embodiment the invention provides a method for producing nitrification inhibitor formulation comprising the step of applying an effective amount of castor oil (1.0%) and oil obtained from *Artemisia annua* to nitrogenous fertilizer.

In an embodiment, the nitrogenous fertilizer may be coated, doped or even mixed with castor oil and oil obtained from *Artemisia annua* or its derivatives.

Yet another embodiment of the invention relates to a method of using Artemisia oil as urease and nitrification inhibitor which comprises of coating urea granules or any other ammonium forming fertilizer with castor oil 1.0% w/w basis of fertilizer as a primary coating (as fixative material) followed by coating with Artemisia oil in the range of 0.5%–5.0% (w/w basis of the fertilizer).

Nitrogen is one of the most vital plant nutrients in agriculture. It is estimated that present global consumption of fertilizer N is of the order of 77 Tg annually which is likely to increase to 145 Tg by the beginning of the next century. India consumes about 9.5 million tones, which is estimated to be increased to about 14 million tones by 2005. Fertilizer urea comprises of more than 80% of the total consumption of nitrogenous fertilizers. Out of the total quantity of N applied to soil the recovery seldom exceeds 50%. It is further less in submerged conditions (rice). Fertilizer urea when applied to soil is hydrolysed by enzyme urease to form $NH_4$ which is prone to losses through volatilization. The $NH_4$ further oxidies to $NO_2$ and finally to $NO_3$ by nitrification which are generally lost through leaching and denitrification. Any process that slows down these transformation processes can reduce loss of N to a great extent. Urease and nitrification inhibitors play a vital role in retarding these processes, thereby increasing the nitrogen use efficiency.

A series of chemicals have been reported as urease and nitrification inhibitors. However, use of many of these has been restricted to research level because of their high cost, low availability, chemical nature, phytotoxicity and environmental consequences. Natural products like those from Karanj (*Pongamia glabra*), neem (*Azadirachia indica*) etc. are reported to have nitrification inhibitory properties. However, commercial exploitation of these materials had not been possible because of one reason or another.

The present invention relates to development of a urease and nitirification inhibitor from Artemisia oil. This is observed to be as effective as chemical inhibitors like DCD, cost effective, as required in very small quantity and ecofriendly (expected to have minimum residual effect).

Urea is the main source of nitrogen fertilizer used in the world due to its high N content, high solubility and non-polarity. However, it is suceptible to various N loss mechanisms, viz. ammonia volatilization, leaching and denitrification. Urease and nitrification inhibitors are used to resist fertilizer N losses by retarding urea hydrolysis and nitrification. A series of synthetic chemicals are used as urease and nitrification inhibitors to restrict urea hydrolysis and denitrification, respectively. These compounds are successful in some parts of the world. However, many of these synthetic chemicals have not been found to be commercially viable because of one reason or another. The present invention deals with the discovery of urease and nitrification inhibitory properties of *Artemisia annua* oil which being a natural product is ecofriendly and cheap as compared to synthetic products. A series of laboratory and greenhouse experiments were conducted to workout the antimicrobial and N regulatory properties of the oil taking dicyandiamide (DCD) as the reference check. Artemisia oil has been found as effective as DCD as nitrification inhibitor. This being a natural source and having both urease and nitrification retardation properties, would be very effective, cheap, safe (eco-friendly) doping material to regulate urea N transformation in soil.

The invention is described in detail hereinbelow with reference to the following examples which should not be construed as limitations on the inventive concept proposed in the invention.

To evaluate the performance of the proposed natural product, incubation experiments were conducted to follow the changes in regulation of urea-N transformation and the influence of the material on soil microbes and microbial activity. Subsequently, greenhouse experiments were conducted to evaluate the influence of the material on apparant N recovery by plants.

The following examples are illustration in nature and should not be construed to limit the scope of invention

EXAMPLE

1. Incubation Experiment

A series of laboratory and greenhouse experiments were conducted to evaluate the efficacy of the proposed material as potent urease and nitrification inhibitor. Artemsia oil was used as the natural product which was compared with dicyandiamide (DCD) as the standard reference. Urea (46% N) was coated separately with the Artemisia oil and DCD using castor (*Ricinus communis*) oil as the fixative material. For this, first coating of urea granules was done by physical mixing of castor oil (1%) followed by the natural product and DCD at 0.50% and 1.00% with urea (w/w basis). After 24 hours of the mixing is done, the coated urea was mixed with 500 g soil (sandy loam, pH 8.2, available N 65 mg $kg^{-1}$) and was kept in plastic container. A control (with urea alone, no coating) was used as the reference check. The soils under all the treatments having four replications each were incubated at 25° C. after maintaining at 60% of the maximum water holding capacity of soil. In one set of experiment, soils were analysed for urease activity and urea N after 24 hours of incubation following methods of Tabatabai and Bremner (1972, Soil. Biol. Biochem. 4: 479–487).

Representative soil samples were analysed for different forms of N i.e. Urea N, $NH_4$ and $NO_3$—N at regular intervals to asses the nitrification inhibitory properties of the materials in question following standard procedures (Douglas and Bremner, 1970, Soil Sci Soc. Am. Proc. 34: 859–862). Another set of experiment was conducted to assay the total bacterial, actinomycetes and nitrifying bacterial (Nirosomonus and Nitrobacter) population (Alexander and Clark, 1965, In Methods of Soil Analysis Part II (C. A. Black Ed.) Am. Soc. Agron. Inc. Wisconsin, USA; KenKnight and Torariko, 1973, Agrokhimiya 7: 3)

2. Greenhouse Experiment

To confirm the results of the incubation experiment, a pot culture experiment was conducted subsequently, taking Japanese mint (*Mentha arvensis*) as the test crop. Eight kg soil (2 mm) were taken in plastic container. The same coating materials and fertilizer (urea) as were in incubation experiment, were imposed, except that instead of two levels of coating materials, it was applied at 1.00% (w/w basis). The experiment was laid in a completely randomized design with four replications. The soils were analysed for different forms of N at regular intervals. In addition the plant materials were analysed for N accumulation and apparent fertilizer N recovery.

$$\text{Apparent } N \text{ recovery} = \frac{N \text{ accumulation in treated pot (mg/kg)} - N \text{ accumulation in control pot (mg/kg) (no fertilzer } N)}{\text{Amount of } N \text{ applied (mg/kg)}} \times 100$$

Influence of the Coating Materials on N Transformation (Mineralization), Urease Activity, Nitrification and Fertilizer N Recovery Results from the incubation experiment (Table 1) indicate that the natural product delayed the hydrolysis of urea as evidenced by a higher concentration of urea-N on day 1 after imposition of treatments. This effect persisted till day 2. Artemisia oil was as effective as DCD with respect to regulation of urea-N transformation to $NH_4$ and $NO_3$. There was a significant retardation of $NO_3$ formation both in DCD and the natural products at both the level of coating. At day 1 $NO_3$ formation retarded by 19–31% with DCD and 13–44% with Artemisia oil as compared to urea alone.

Comparing on the basis of mean $NO_3$ produced, the % retardation of nitrification at 0.5% level of application were 31 and 29% with DCD and Artemisia oil, respectively. The corresponding retardation at 1.0% level of application were 42 and 36%, respectively. DCD maintained a higher level of $NH_4$ as compared to Artemisia oil. Accumulation of $NH_4$ is undesirable as an excess of $NH_3$ helps in increasing soil pH making the conditions in soil microsites congenial for $NH_3$ volatilization.

Almost similar trend was observed with respect to transformation of urea N (forms of N) in the greenhouse experiment when mineral N was assessed at weekly intervals (Table 2). As in incubation experiment, accumulation of $NH_4$ was higher in DCD treated soil as compared to Artemisia oil treated soil. Total $NO_3$ production was estimated to be retarded by 60% and 50% over urea alone, with coating of urea with DCD and Artemisia oil, respectively.

The incubation experiment further indicates that like DCD, Artemisia oil influenced the counts of Nitrosomous and Nitrobacter reponsible for nitrification, as well as actinomycetes and total bacteria (Table 4). Nitrosomus population decreased by 9–14% with DCD and 36–45% with Artemisia. Likewise, Nitrobacter population decreased to an extent of 69–87% with DCD and 65–77% with Artemisia. The retardation increased with increasing the level of coating material.

Total actinomycetes population decreased with DCD at both the levels of application whereas Artemisia did not have any influence on actinomycetes population. Finally, an account of the total bacterial population indicate a significant antibacterial properties of both the synthetic and natural products.

Influence of these materials on urease and nitrification inhibitory properties and regulation of urea-N transformation was reflected on the apparent N recovery, total N accumulation by the plant and subsequently the herb yield of the test crop (Table 5). Herb yield of Japanese mint increased by 37%, 82% and 81% over control with urea alone applied at 100 mg $kg^{-1}$ soil, and that applied with coating DCD and Artemisia, respectively. When compared with urea alone, the herb yield with DCD and Artemisia increased by 29 and 31%, respectively. Both the materials augmented the apparent N recovery. The N recoveries were 54 and 55% with DCD and Artemisia respectively, as against 37% with urea alone.

The present invention comprises of evaluation of urease and nitrification inhibitory properties in Artemisia oil. At 0.5% level of application Artemisia decreased $NO_3$ formation to an extent of 29%. The corresponding value at 1.0% level of application was 36%. Artemisia oil was found superior to DCD with respect to retardation of urease activity. Urease activity decreased by 32–35% with Artemisia oil as compared to 5–15% with DCD. This product inhibits the population of both Nitrosomus and Nitrobacter; actinomycetes population was not affected by Artemisia oil. Coating of urea with Artemisia oil increased apparent N recovery to 56% as against 37% with urea alone and 54% with DCD.

TABLE 1

Influence of different coating materials on N transformation at different stages of incubation

| | Forms of N | | | | | | | | | | | | | | | | | |
|---|---|---|---|---|---|---|---|---|---|---|---|---|---|---|---|---|---|---|
| | Day 1 | | | Day 2 | | | Day 3 | | | Day 7 | | | Day 14 | | | Mean | | |
| Treatments[a] | Urea | $NH_4$ | $NO_3$ | Urea | $NH_4$ | $NO_3$ | Urea | $NH_4$ | $NO_3$ | Urea | $NH_4$ | $NO_3$ | Urea | $NH_4$ | $NO_3$ | Urea | $NH_4$ | $NO_3$ |
| Urea alone (no coating materials) | 4.5 | 42.5 | 99 | — | 6.2 | 218 | — | 16.5 | 16.9 | — | 10.5 | 136 | — | 6.9 | 155 | — | 16.5 | 156 |
| Urea + DCD | | | | | | | | | | | | | | | | | | |
| (0.50) | 16.0 | 59.5 | 80 | — | 8.5 | 125 | — | 25.2 | 9.5 | — | 6.2 | 100 | — | 8.5 | 135 | — | 21.6 | 107 |
| (1.00) | 16.8 | 69.5 | 68 | — | 20.0 | 60 | — | 35.6 | 99 | — | 9.2 | 102 | — | 8.9 | 120 | — | 28.6 | 90 |
| Urea + Artemisia | | | | | | | | | | | | | | | | | | |
| (0.50) | 27.5 | 35.0 | 86 | 7.8 | 5.0 | 120 | — | 22.1 | 112 | — | 3.5 | 109 | — | 9.5 | 125 | — | 15.0 | 110 |
| (1.00) | 32.5 | 56.5 | 55 | 9.2 | 8.9 | 92 | — | 24.2 | 118 | — | 3.9 | 101 | — | 10.5 | 128 | — | 20.8 | 99 |
| LSD (P = 0.05) | 3.45 | 8.90 | 7.50 | — | 1.25 | 10.3 | — | 3.90 | 0.50 | — | — | 6.50 | — | — | 7.50 | — | 4.50 | 8.50 |

*Coating materials added at 0.50 and 1.0% w/w basis; urea applied at 100 mg $kg^{-1}$ soil.

TABLE 2

Influence of different coating materials on N mineralization in soil cropped with menthol mint. (*Mentha arvensis*)

| | Mineral-N (mgkg$^{-1}$ soil) | | | | | | | | | | | |
|---|---|---|---|---|---|---|---|---|---|---|---|---|
| | Week I | | Week II | | Week III | | Week IV | | Week V | | Total | |
| Treatment s | $NH_4$ | $NO_3$ | $NH_4$ | $NO_3$ | $NH_4$ | $NO_3$ | $NH_4$ | $NO_3$ | $NH_4$ | $NO_3$ | $NH_4$ | $NO_3$ |
| Control (no fertilizer and no coating material) | 6.5 | 6.4 | — | 4.8 | — | 6.8 | — | 9.3 | 2.8 | 3.5 | 9.3 | 30.8 |

TABLE 2-continued

Influence of different coating materials on N mineralization in soil cropped with menthol mint. (*Mentha arvensis*)

| | Mineral-N (mgkg$^{-1}$ soil) | | | | | | | | | | | |
|---|---|---|---|---|---|---|---|---|---|---|---|---|
| | Week I | | Week II | | Week III | | Week IV | | Week V | | Total | |
| Treatments | NH$_4$ | NO$_3$ | NH$_4$ | NO$_3$ | NH$_4$ | NO$_3$ | NH$_4$ | NO$_3$ | NH$_4$ | NO$_3$ | NH$_4$ | NO$_3$ |
| Urea alone (no coating materials) | 20.0 | 109 | 25.5 | 120 | 8.0 | 45 | — | 34 | 10.2 | 18.9 | 63.8 | 324 |
| Urea + DCD | 45.0 | 39.0 | 50.0 | 25.0 | 12.0 | 14.0 | 10.5 | 20.0 | 6.5 | 12.5 | 12.4 | 110 |
| Urea + Artemisia | 25.0 | 49.0 | 20.5 | 35.0 | 6.5 | 17.5 | — | 22.8 | 5.9 | 11.2 | 58.0 | 135 |
| LSD (P = 0.05) | 3.8 | 5.2 | 2.9 | 5.4 | 2.5 | 5.0 | — | 6.5 | 1.9 | 2.8 | 6.9 | 13.5 |

TABLE 3

Influence of different coating materials on urease activity (in terms of $\mu$g NH$_4$-N liberated/g soil/hour)

| Treatments* | Urease activity |
|---|---|
| Control (No fertilizer and no coating materials) | 24.5 |
| Urea alone (No coating materials) | 66.5 |
| Urea + DCD (0.50) | 56.7 |
| (1.00) | 45.1 |
| Urea + Artemisia oil | |
| (0.50) | 45.2 |
| (1.00) | 43.5 |
| LSD(P = 0.05) | 8.23 |

*Urea applied @ 100 mg kg$^{-1}$ soil; coating materials applied @ 0.50 and 1.00% (w/w basis)

TABLE 4

Influence of coating materials on Nitrosomomus Nitrobacter, total actinomycetes and bacterial population in soil.

| Treatment* | Nitrosomonus ×10$^3$ g$^{-1}$ soil | Nitrobacter ×10$^3$ g$^{-1}$ soil | Actinomycetes ×10$^4$ g$^{-1}$ soil | Total bacteria ×10$^5$ g$^{-1}$ soil |
|---|---|---|---|---|
| Control (no fertilizer and no coating materials) | 1.10 | 2.50 | 6.50 | 2.00 |
| Urea alone (no coating materials) | 3.30 | 14.00 | 5.60 | 4.00 |
| Urea + DCD (0.50) (1.00) | 3.00 2.85 | 4.30 1.80 | 1.00 1.00 | 1.00 1.00 |
| Urea + Artemisia oil | | | | |
| (0.50) | 2.10 | 4.90 | 6.00 | 3.50 |
| (1.00) | 1.80 | 3.20 | 6.00 | 2.50 |
| LSD (P = 0.05) | 0.25 | 0.50 | 0.45 | 0.45 |

*Urea applied @ 100 mg kg$^{-1}$ soil; coating materials @ 0.50 and 1.00% (w/w basis)

TABLE 5

Influence of different coating materials on herb yield, total N accumulation and apparent N recovery in menthol mint.

| Treatment Level of urea-N (mg kg$^{-1}$) | Coating materials (1.00%) | Herb yield (g pot$^{-1}$) | N accumulation (mg pot$^{-1}$) | Apparent N recovery (%) |
|---|---|---|---|---|
| 0 (Control) | Nil | 32.5 | 170 | — |
| 100 | Nil | 44.5 | 467 | 37.12 |
| | DCD | 59.2 | 603 | 54.12 |
| | Artemisia | 58.9 | 612 | 55.25 |
| LSD (P = 0.05) | | 5.20 | 11.8 | |

ADVANTAGES OF THE INVENTIONS

1. This product is as effective as dicyandiamide (DCD) as nitrification inhibitor.
2. This product has higher urease inhibitory properties.
3. This product doesn't allow high accumulation of NH$_4$—N following hydrolysis of urea Higher accumulation of NH$_4$—N helps in increasing soil pH and thereby causing volatilization of NH$_3$.
4. This product being natural and having low persistence, is expected to leave no adverse effect in soil, on beneficial microflora and related transformation processes and environment.
5. This product is better than other essential oils and derivatives.
6. This product is cheaper than many synthetic inhibitors.

What is claimed is:

1. A formulation useful as a nitrification and urease inhibitor, said formulation comprising an effective amount of nitrogenous fertilizer, castor oil and oil derived from *Artemisia annua*, in an amount sufficient to enhance the nitrification inhibitory activity of the formulation.

2. The formulation according to claim 1 wherein the oil derived from *Artemisia annua* is in the range of about 0.5–5% (w/w basis of fertilizer).

3. The formulation according to claim 1 wherein castor oil is present in an amount of 0.2% to 2.0% (w/w basis of fertilizer).

4. The formulation according to claim 3 wherein castor oil is present in an amount of 1.0% (w/w basis of fertilizer).

5. The formulation according to claim 1 wherein the essential oil of *Artemisia annua* is coated, mixed or doped with the nitrogenous fertilizer.

6. The formulation according to claim 1 wherein the nitrogen fertilizer is selected from urea, ammonium sulphate, or ammonium producing fertilizer.

7. The formulation according to claim 1 wherein the essential oil is selected from Artemisia oil or its derivatives.

8. A method for producing nitrification inhibitor formulation comprising:

applying an effective amount of castor oil and oil obtained from *Artemisia annua* to nitrogenous fertilizer.

9. The method according to claim 8 wherein castor oil is present in an amount of 0.2% to 2.0% (w/w basis of fertilizer).

10. The method according to claim 9 wherein castor oil is present in an amount of 1.0% (w/w basis of fertilizer).

11. The method according to claim 8 wherein the nitrogenous fertilizer is coated, doped or mixed with castor oil and oil obtained from *Artemisia annua* or its derivatives.

12. The method according to claim 8 wherein the nitrogen fertilizer is selected from urea, ammonium sulphate, or ammonium producing fertilizer.

13. The method according to claim 8 wherein the amount of oil derived from *Artemisia annua* is in the range of about 0.5–5% (w/w basis of the fertilizer).

14. A method of using Artemisia oil as urease and nitrification inhibitor which comprises:

coating urea granules or ammonium forming fertilizer with castor oil 1.0% w/w basis of fertilizer as a primary coating, followed by coating with Artemisia oil in the range of 0.5%–5.0% (w/w basis of the fertilizer).

* * * * *

UNITED STATES PATENT AND TRADEMARK OFFICE
CERTIFICATE OF CORRECTION

PATENT NO.    : 6,315,807 B1
DATED         : November 13, 2001
INVENTOR(S)   : D.D. Patra et al.

It is certified that error appears in the above-identified patent and that said Letters Patent is hereby corrected as shown below:

Title page,
Item [75], Inventors, change "Locknow" to -- Lucknow --.

Signed and Sealed this

Second Day of April, 2002

Attest:

JAMES E. ROGAN
Attesting Officer    Director of the United States Patent and Trademark Office